(12) United States Patent
Thielert et al.

(10) Patent No.: US 10,858,251 B2
(45) Date of Patent: Dec. 8, 2020

(54) PROCESS AND DEVICE FOR THE PREPARATION OF SULFURIC ACID

(71) Applicants: THYSSENKRUPP INDUSTRIAL SOLUTIONS AG, Essen (DE); thyssenkrupp AG, Essen (DE)

(72) Inventors: Holger Thielert, Dortmund (DE); Zion Guetta, Dortmund (DE)

(73) Assignees: THYSSENKRUPP INDUSTRIAL SOLUTIONS AG, Essen (DE); THYSSENKRUPP AG, Essen (DE)

( * ) Notice: Subject to any disclaimer, the term of this patent is extended or adjusted under 35 U.S.C. 154(b) by 310 days.

(21) Appl. No.: 16/082,223

(22) PCT Filed: Mar. 2, 2017

(86) PCT No.: PCT/EP2017/054890
§ 371 (c)(1),
(2) Date: Sep. 4, 2018

(87) PCT Pub. No.: WO2017/149068
PCT Pub. Date: Sep. 8, 2017

(65) Prior Publication Data
US 2020/0290876 A1  Sep. 17, 2020

(30) Foreign Application Priority Data

Mar. 4, 2016  (DE) .................. 10 2016 103 976

(51) Int. Cl.
*C01B 17/775* (2006.01)
*C01B 17/765* (2006.01)
*C01B 17/80* (2006.01)

(52) U.S. Cl.
CPC ........ *C01B 17/775* (2013.01); *C01B 17/7655* (2013.01); *C01B 17/803* (2013.01); *C01B 17/806* (2013.01)

(58) Field of Classification Search
CPC ......... C01B 17/69; C01B 17/74; C01B 17/76; C01B 17/765; C01B 17/7655; C01B 17/80; C01B 17/806
See application file for complete search history.

(56) References Cited

U.S. PATENT DOCUMENTS 2,655,431 A * 10/1953 Allen, Jr. ................ C01B 17/74
423/522
3,475,120 A * 10/1969 Benefield .............. C01B 17/762
423/522

(Continued)

FOREIGN PATENT DOCUMENTS

CN   101698470 A   4/2010
DE     4019184 A   1/1991

(Continued)

OTHER PUBLICATIONS

English Translation of International Search Report issued in PCT/EP2017/054890, dated May 15, 2017 (dated Jun. 7, 2017).

(Continued)

*Primary Examiner* — Timothy C Vanoy
(74) *Attorney, Agent, or Firm* — Thyssenkrupp North America, LLC

(57) ABSTRACT

A process for preparing sulfuric acid may involve oxidizing sulfur to sulfur dioxide by way of dried air in a first oxidation stage. The sulfur dioxide may then be oxidized to sulfur trioxide in a second oxidation stage. The sulfur trioxide may be absorbed by sulfuric acid in at least one absorption stage. Further, heated sulfuric acid may be drawn off from the absorption stage and used for generating steam. Process gas from an intermediate absorption stage may be recycled to the second oxidation stage and, in some cases, a final absorption stage after the process gas flows through the second oxidation stage.

17 Claims, 1 Drawing Sheet

(56) References Cited

U.S. PATENT DOCUMENTS

| | | | |
|---|---|---|---|
| 4,576,813 A * | 3/1986 | McAlister | C01B 17/765 |
| | | | 423/522 |
| 4,996,038 A | 2/1991 | McAlister | |
| 5,130,112 A * | 7/1992 | McAlister | C01B 17/765 |
| | | | 423/522 |
| 5,194,239 A * | 3/1993 | Masseling | C01B 17/74 |
| | | | 423/522 |
| 5,538,707 A | 7/1996 | McAlister | |
| 5,593,652 A * | 1/1997 | Peng | C01B 17/7655 |
| | | | 423/522 |
| 6,279,514 B1 | 8/2001 | Browder | |
| 8,894,965 B2 | 11/2014 | Vera-Castaneda | |
| 9,278,859 B2 * | 3/2016 | Vera-Castaneda | |
| | | | C01B 17/7655 |
| 2014/0322125 A1 | 10/2014 | Vera-Castañeda | |

FOREIGN PATENT DOCUMENTS

| | | |
|---|---|---|
| JP | S60-036310 A | 2/1985 |
| JP | 2002053311 A | 2/2002 |
| JP | 2015212226 A | 11/2015 |

OTHER PUBLICATIONS

H Müller, "Sulfuric Acid and Sulfur Trioxide", Ullmann's Encyclopedia of Industrial Chemistry, Jan. 1, 2000 (Jan. 1, 2000), pp. 1-71.

* cited by examiner

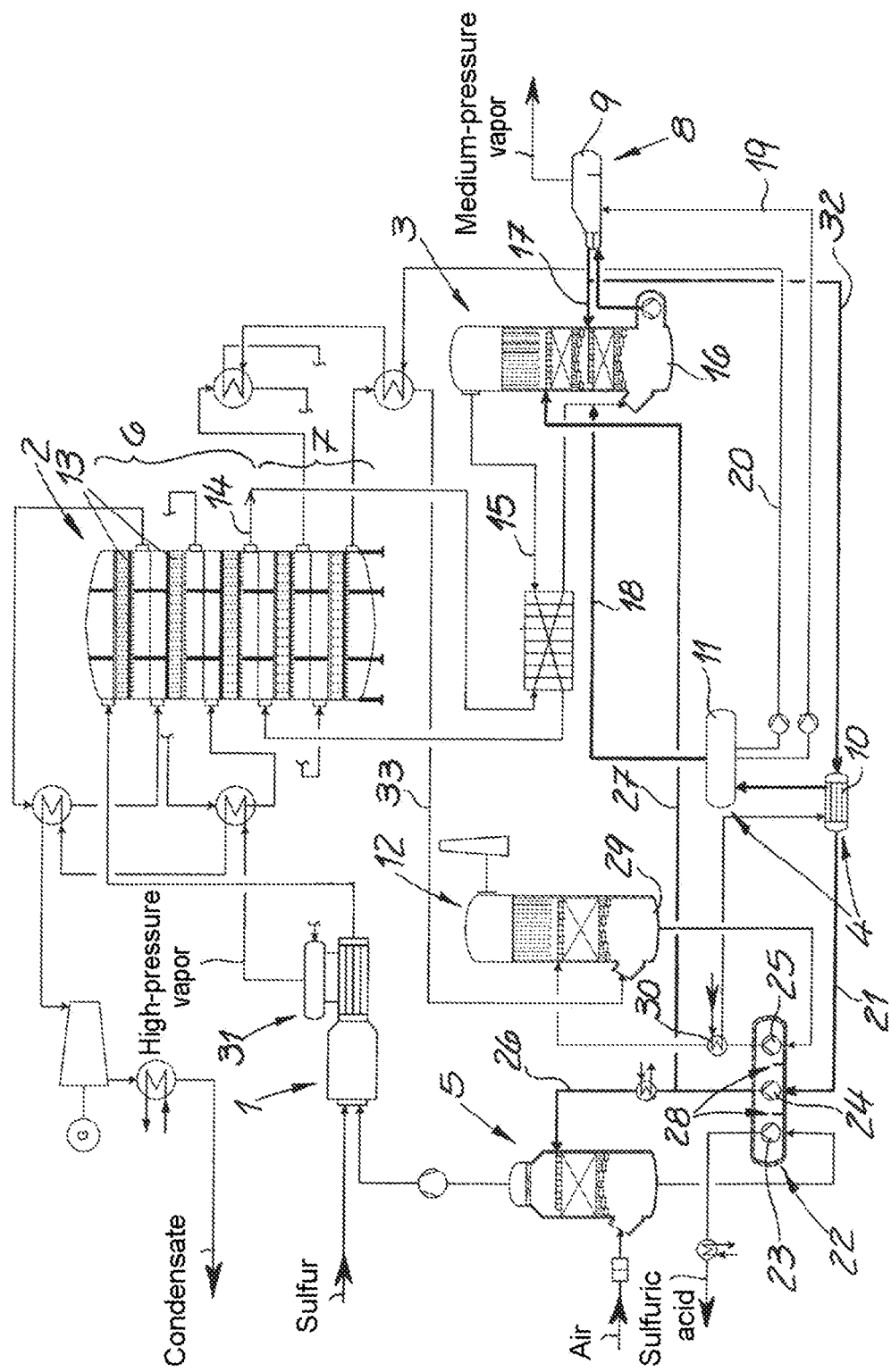

PROCESS AND DEVICE FOR THE PREPARATION OF SULFURIC ACID

CROSS REFERENCE TO RELATED APPLICATIONS

This application is a U.S. National Stage Entry of International Patent Application Serial Number PCT/EP2017/054890, filed Mar. 2, 2017, which claims priority to German Patent Application No. DE 10 2016 103 976.4, filed Mar. 4, 2016, the entire contents of both of which are incorporated herein by reference.

FIELD

The present disclosure generally relates to sulfuric acid, including processes and apparatuses for preparing sulfuric acid.

BACKGROUND

The heat of combustion is utilized in the oxidation, particularly in the combustion of the sulfur, and more specifically, preferably, in order to generate high-pressure vapor, to heat boiler water, and to superheat high-pressure vapor. The formation of sulfuric acid is an exothermic process. Already disclosed so far has been the recovery of this heat through heat exchange between the hot sulfuric acid formed and a fluid—water or air, for example. The efficiency of the known heat recovery processes leaves something to be desired, however. With the known processes, moreover, the cost and complexity required for the process regime, particularly the cost and complexity of apparatus, is relatively high. Accordingly, the known measures are amenable to improvement.

Thus a need exists for a process that allows heat recovery to be maximized for relatively low cost and complexity, especially cost and complexity of apparatus. A need also exists for a corresponding apparatus for implementing such a process.

BRIEF DESCRIPTION OF THE FIGURE

FIG. 1 is a schematic diagram of an example apparatus for implementing a process for preparing sulfuric acid.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to processes for preparing sulfuric acid. Sulfur may be oxidized to sulfur dioxide by way of dried air in at least one first oxidation stage. Sulfur dioxide may be oxidized to sulfur trioxide in at least one oxidation stage, more particularly in at least one second oxidation stage. Sulfur trioxide may be absorbed in at least one absorption stage to form sulfuric acid. The present disclosure further relates to apparatuses for implementing such processes. In the context of the present disclosure, sulfuric acid is produced in particular by way of the contact process or double contact process. This may involve first sulfur being oxidized to sulfur dioxide, and then the sulfur dioxide being further oxidized to sulfur trioxide by means of a catalyst in a converter. Sulfuric acid may then be generated from the sulfur trioxide. The sulfuric acid may be used, for example, to produce phosphate-containing fertilizers or else for other purposes.

In some examples, a process for preparing sulfuric acid, wherein usefully sulfur is oxidized—more particularly burned—to sulfur dioxide by means of air, more particularly by means of dried air, in at least one first oxidation stage, the sulfur dioxide is oxidized to sulfur trioxide in at least one oxidation stage, more particularly in at least one second oxidation stage, sulfur trioxide is absorbed in at least one absorption stage to form sulfuric acid, more particularly is absorbed by sulfuric acid, and heated sulfuric acid is drawn off from the absorption stage and used for generating steam, which steam is introduced into the absorption stage. According to preferred embodiment of the invention, sulfur dioxide is generated by oxidation/burning of sulfur by means of air, more particularly by means of dried air, in a first oxidation stage. In principle, however, the sulfur dioxide for the process of the invention can also be generated otherwise and then oxidized to sulfur trioxide in accordance with the invention in at least one oxidation stage, more particularly in at least one second oxidation stage. Within the scope of the invention is the passing of sulfur trioxide in countercurrent to the sulfuric acid in the absorption stage. With preference, the steam introduced into the absorption stage is likewise passed in countercurrent to the sulfuric acid.

Essential to the invention is the introduction of the steam to the absorption stage. This absorption stage, as elucidated in more detail later on below, is configured in particular as an intermediate absorption stage of the sulfuric acid process. The term "intermediate absorption stage" refers, in the context of the invention, more particularly to an absorption stage in which a first absorption of sulfur trioxide takes place, and the term implies that there is at least one further absorption stage, more particularly final absorption stage. It is within the invention for the steam to be introduced as low-pressure steam into the absorption stage, more particularly intermediate absorption stage. In that case the low-pressure steam usefully has a pressure of more than 0 bar to 4 bar. The pressure figures here and below relate to statements of the absolute pressure. According to one embodiment of the invention, the low-pressure steam is introduced (as elucidated further later on below) as a low-pressure steam/gas mixture into the absorption stage, more particularly into the intermediate absorption stage. By absorbing sulfur trioxide, the sulfuric acid is concentrated in the absorption stage. Because of the steam passed in, there is at the same time a dilution of the sulfuric acid in the absorption stage. Because of the heat formed during the condensation of the steam and during the reaction of the steam with the sulfur trioxide, there is an increase in the temperature, more particularly in the liquid-phase temperature, in the absorption stage. As a result, excess heated sulfuric acid is formed, the heat of which can be utilized efficiently in accordance with the invention. In accordance with the invention, the excess heated sulfuric acid is drawn off from the absorption stage and, according to preferred embodiment, first used in a heat recovery facility for generating vapor, preferably steam, more particularly for generating medium-pressure vapor, preferably medium-pressure steam. This medium-pressure vapor, more particularly medium-pressure steam, usefully has a pressure of 4 to 14 bar. The excess sulfuric acid cooled in this process is used subsequently for the generation of the steam—usefully the low-pressure steam—in accordance with the invention, that steam then being introduced into the absorption stage. This procedure according to the invention permits very effective heat recovery of the residual heat described at the outset. The individual preferred embodiments possible for this are elucidated in more detail hereinafter.

It is within the scope of the invention for the sulfuric acid to be prepared by the process of the invention first in a manner known per se according to a contact process or double contact process. Sulfur is usefully first oxidized—more particularly burned—to sulfur dioxide in a first oxidation stage using air/atmospheric oxygen. The heat of combustion formed during the burning of the sulfur is used, according to preferred embodiment, for generating vapor, preferably steam, more particularly for generating high-pressure vapor, preferably high-pressure steam. In that case the high-pressure vapor, more particularly the high-pressure steam, usefully has a pressure of 14 to 120 bar, preferably of 30 bar to 120 bar. The high-pressure vapor/high-pressure steam is used in turbines, for example.

It is within the scope of the invention for the air introduced into the first oxidation stage to be dried. Drying takes place usefully with sulfuric acid and more preferably as elucidated later on. Furthermore, it is within the scope of the invention for the sulfur dioxide to be introduced—preferably together with air—into an oxidation stage, more particularly second oxidation stage, which is configured as a converter. Here, the sulfur dioxide is oxidized to sulfur trioxide ($SO_3$), and advisedly with the assistance of a catalyst, and more particularly by means of vanadium pentoxide ($V_2O_5$) as catalyst. For this purpose, the sulfur dioxide in the converter flows preferably through a plurality of catalyst stages/catalyst beds.

According to a particularly advisable embodiment of the process of the invention, process gas from the oxidation stage, more particularly from the second oxidation stage/from the converter, containing sulfur dioxide and containing sulfur trioxide, is introduced into the absorption stage, which is configured as an intermediate absorption stage. Following absorption of sulfur trioxide in this intermediate absorption stage, the process gas is advantageously recycled to the oxidation stage, more particularly second oxidation stage. The excess heated sulfuric acid formed in the intermediate absorption stage is taken off—as elucidated above—from the intermediate absorption stage and is used in accordance with the invention. The oxidation stage, more particularly second oxidation stage, is configured preferably as a second oxidation facility in the form of a multistage, preferably two-stage, converter, a first converter stage being connected via at least one process gas discharge line to the intermediate absorption stage. When the process gas containing sulfur dioxide has passed through the first converter stage, the process gas is introduced into the intermediate absorption stage, more particularly intermediate absorption facility, via the at least one process gas discharge line. Furthermore, the intermediate absorption facility is connected via at least one process gas supply line to a second converter stage of the second oxidation facility, so that the process gas, after flowing through the intermediate absorption facility, can be introduced into the second converter stage. In this way, the process gas flows through the entire converter/the entire second oxidation facility.

It is within the scope of the invention for the process gas, after passing through the oxidation stage, more particularly the second oxidation stage, to be introduced into a final absorption stage/final absorption facility. In this final absorption stage, the sulfur trioxide still present in the process gas is absorbed, being absorbed more particularly by sulfuric acid. The sulfuric acid is heated in the final absorption stage, more particularly in the liquid phase of the final absorption facility, by the formation of sulfuric acid. According to preferred embodiment of the invention, the sulfuric acid heated in the final absorption stage is used for heating water, especially boiler feed water, and this heated water/boiler feed water is supplied preferably to the steam generation facility, and usefully this heated water/boiler feed water is used for generating the steam, more particularly the low-pressure steam, which is introduced into the absorption stage for the purpose of reaction with the sulfur trioxide. In this way as well it is possible to realize further efficient heat recovery.

Hereinafter, the use of the heated sulfuric acid drawn off from the intermediate absorption stage is elucidated in more detail. It is within the scope of the invention for the heated sulfuric acid drawn off from the intermediate absorption stage to be supplied to the heat recovery facility, in which thermal energy carried by the sulfuric acid is recovered, more particularly in the form of vapor and preferably in the form of medium-pressure vapor. Here, by means of the heat taken off from the intermediate absorption stage, a relatively large amount of medium-pressure vapor can be generated and, accordingly, heat recovery is already effective. The sulfuric acid cooled in the generation of the vapor, preferably medium-pressure vapor, is used at least partly in the steam generation facility for generating the steam, more particularly the low-pressure steam, in accordance with the invention, this steam then being introduced into the intermediate absorption stage for the purpose of reaction with sulfuric trioxide. The vapor, preferably medium-pressure vapor, generated in the heat recovery facility is usefully drawn off and supplied for further utilization. According to preferred embodiment, the sulfuric acid cooled in the heat recovery facility is partly recycled to the intermediate absorption stage. Accordingly, advisedly, there is circulation of a part of the sulfuric acid between the intermediate absorption stage and the heat recovery facility. The other part of the sulfuric acid cooled in the heat recovery facility is preferably supplied—as described—for steam generation, more particularly for low-pressure steam generation.

It is therefore within the scope of the invention for at least part of the sulfuric acid drawn off from the intermediate absorption stage/intermediate absorption facility, more particularly of the sulfuric acid drawn off from the heat recovery facility, to be supplied to the steam generation facility for generating the steam, preferably low-pressure steam, in accordance with the invention. Usefully, in the steam generation facility, water, more particularly boiler feed water, is heated by means of the hot sulfuric acid and converted at least partly into steam, preferably into low-pressure steam. It is advisable for the water/boiler feed water in this case to have been preheated by means of the heated sulfuric acid originating from the final absorption stage. The cooled sulfuric acid drawn off from the heat recovery facility that is preferably provided is therefore hot enough to convert water/boiler feed water into steam and more particularly into low-pressure steam. This steam/low-pressure steam may include oxygen and/or other gases which were dissolved in the water/boiler feed water. The supplying of steam, more particularly of low-pressure steam, therefore here also encompasses the supplying of a steam/gas mixture, more particularly a low-pressure steam/gas mixture. This steam, more particularly low-pressure steam, is then supplied to the intermediate absorption stage for diluting the sulfuric acid. According to a recommended variant embodiment of the invention, only a part of the water/boiler feed water is converted into steam, more particularly low-pressure steam, in the steam generation facility, and a further part of the water/boiler feed water is only heated and used for heat exchange at other components of the apparatus of the invention. Steam, more particularly low-pressure steam, is usefully separated by flash evaporation (flashed) from the water/boiler feed water in a water vessel, and passed on to the intermediate absorption stage. There, the steam, more particularly low-pressure steam, condenses in the sulfuric acid and reacts with sulfur trioxide to form sulfuric acid. In this way, a low-temperature source is converted into a hotter heat source. The water/boiler feed water that remains in the steam generation facility following the removal of the steam, more particularly low-pressure steam, is passed in particular into the heat recovery facility and usefully therein vapor, preferably medium-pressure vapor, is generated from the water/boiler feed water. Accordingly, the water from the steam generation facility can be supplied as medium-pressure boiler feed water to the heat recovery facility. Moreover, the water from the steam generation facility, as high-pressure boiler feed water, can be passed on to further components of the apparatus of the invention for heat exchange. It is within the scope of the invention for there to be corresponding pumps for onwardly conveying the medium-pressure boiler feed water and/or the high-pressure boiler feed water.

The generation of steam in the steam generation facility, in accordance with the invention, leaves cooled sulfuric acid, which usefully is drawn off from the steam generation facility and used further. This cooled sulfuric acid has a temperature of around 95° C., for example. One particularly preferred embodiment of the invention is characterized in that cooled sulfuric acid drawn off from the steam generation facility is supplied to the final absorption stage/final absorption facility, in which preferably sulfur trioxide is passed in countercurrent to this sulfuric acid and is absorbed by this sulfuric acid. Furthermore, it is within the scope of the invention for cooled sulfuric acid drawn off from the steam generation facility to be used for drying the air that is required for oxidizing the sulfur in the first oxidation stage. For this purpose, the sulfuric acid drawn off from the steam generation facility is introduced preferably into a drying apparatus upstream of the first oxidation facility, and in this drying facility the air is preferably guided in countercurrent to the sulfuric acid passed into the drying facility. One particularly preferred embodiment of the invention is characterized in that cooled sulfuric acid drawn off from the steam generation facility is recycled to the intermediate absorption stage. For this purpose, usefully, the process gas containing sulfur trioxide and flowing through the intermediate absorption stage/intermediate absorption facility is passed in countercurrent to the recycled sulfuric acid.

In order to solve the technical problem, the invention further teaches an apparatus for producing sulfuric acid, wherein usefully a first oxidation facility is provided for generating sulfur dioxide, there is an oxidation facility, more particularly a second oxidation facility, for the oxidation of sulfur dioxide to sulfur trioxide, the oxidation facility, more particularly the second oxidation facility, has attached to it at least one absorption facility, more particularly an intermediate absorption facility, for absorbing the sulfur trioxide, preferably by means of sulfuric acid, the absorption facility, more particularly intermediate absorption facility, is joined to a steam generation facility with the proviso that heated sulfuric acid from the absorption facility/intermediate absorption facility can be supplied to the steam generation facility for the purpose of generating steam, and steam from the steam generation facility can be introduced into the absorption facility, more particularly intermediate absorption facility. The steam here is usefully introduced together with process gas supplied from the oxidation facility, more particularly from the second oxidation facility, into the absorption facility, more particularly intermediate absorption facility.

A feature of one recommended embodiment of the apparatus of the invention is that there is a drying facility for drying air, the dried air being introduced into the first oxidation facility for oxidation, more particularly burning, of sulfur to form sulfur dioxide. In this case the drying facility is connected to the absorption facility/intermediate absorption facility preferably in such a way that excess sulfuric acid from the absorption facility, more particularly intermediate absorption facility, can be introduced into the drying facility for drying the air.

It is within the scope of the invention for the oxidation facility, more particularly the second oxidation facility, to be configured as a multistage, preferably two-stage, converter, wherein each converter stage comprises at least one catalyst tray, preferably a plurality of catalyst trays. A first converter stage of the converter is usefully connected via at least one process gas discharge line to the absorption facility, more particularly intermediate absorption facility, and the absorption facility, more particularly intermediate absorption facility, is connected via at least one process gas supply line to a second converter stage of the converter. In this way, process gas containing sulfur dioxide and containing sulfur trioxide, from the first converter stage, is able to flow through the absorption facility, more particularly intermediate absorption facility, and is then introduced into the second converter stage of the oxidation facility, more particularly of the second oxidation facility.

In the absorption facility, more particularly intermediate absorption facility, sulfur trioxide is absorbed from the process gas by sulfuric acid. According to preferred embodiment, the absorption facility, more particularly intermediate absorption facility, is joined to a heat recovery facility, and this heat recovery facility preferably comprises at least one boiler—more preferably at least one medium-pressure boiler. The heated sulfuric acid drawn off from the absorption facility, more particularly intermediate absorption facility, is used here preferably for heating boiler feed water, more particularly for generating medium-pressure vapor, and in this process thermal energy is transferred from the sulfuric acid to the boiler feed water. It is within the scope of the invention for sulfuric acid cooled accordingly to be supplied to the steam generation facility for the purpose of generating the steam in accordance with the invention. A part of the sulfuric acid cooled in the heat recovery facility is preferably recycled to the absorption facility, more particularly intermediate absorption facility.

According to particularly preferred embodiment of the invention, the steam generation facility comprises at least one cooling facility in which water, preferably boiler feed water, is heated and at least partly evaporated with the aid of the sulfuric acid drawn off from the heat recovery facility. Joined to the cooling facility, usefully, is at least one water vessel, preferably boiler feed water vessel, and in this water vessel steam is separated from the water/boiler feed water by flash evaporation (i.e., is flashed). It is within the scope of the invention for the water vessel/boiler feed water vessel to be joined to the absorption facility, more particularly intermediate absorption facility, so that steam, more particularly low-pressure steam, can be passed from the water vessel into the absorption facility, more particularly intermediate absorption facility. Here, so to speak, a low-temperature source is converted into a hotter heat source.

A feature of one recommended embodiment of the apparatus of the invention is that the steam generation facility is connected to a/the final absorption facility and/or is connected to a/the drying facility for drying the air which is supplied to the first oxidation facility. As a result of these possibilities for joining, the cooled sulfuric acid drawn off from the steam generation facility is passed into the final absorption facility for absorbing sulfur trioxide and/or is passed into the drying facility for drying the air for the burning of the sulfur. One very preferred embodiment of the apparatus of the invention, furthermore, is characterized in that the steam generation facility is joined to the absorption facility, more particularly intermediate absorption facility, with the proviso that cooled sulfuric acid drawn off from the steam generation facility can be introduced into the absorption facility, more particularly intermediate absorption facility, for absorbing sulfur trioxide.

The invention is based on the finding that, with the process of the invention and with the apparatus of the invention, very effective and functionally reliable heat recovery is possible in the context of sulfuric acid production. First and foremost, the residual heat of the process, elucidated at the outset, can be transferred and utilized in an efficient and functionally reliable manner. The invention is further based on the finding that this advantageous recovery of the residual heat can be realized in particular when steam, preferably low-pressure steam, is generated from a low-temperature heat source and is converted into medium-pressure vapor and/or high-pressure vapor in the sulfuric acid process. It is within the scope of the invention here for a low-temperature heat source to be converted into a hotter heat source. Particular significance is ascribed in this context to the functional interaction between the absorption stage, more particularly intermediate absorption stage, and the steam generation facility, and first and foremost to the functional connection between absorption stage/intermediate absorption stage, heat recovery facility, and steam generation facility. As a result, the invention achieves a maximization of heat recovery at the same time as a simple process regime. In accordance with the invention, up to 95% of the heat of reaction of the sulfuric acid process can be recovered as high-value heat for low cost and complexity. The cost and complexity involved in the invention, particularly the cost and complexity of apparatus, is instead surprisingly low by comparison with the success achieved, and consequently the expenditures involved as well are relatively low.

The process of the invention is elucidated in more detail below by means of a heat budget. Connected with the sulfur burning sulfuric acid process are the following heats of reaction:

| Reaction | Heat of reaction $\Delta H_r°_{(25°\,C.)}$[kWh/t 100% $H_2SO_4$] |
|---|---|
| $S + O_2 \rightarrow SO_2$ | −850 |
| $SO_2 + \frac{1}{2} O_2 \rightarrow SO_3$ | −283 |
| $SO_3 + H_2O \rightarrow H_2SO_4$ | −368 |

The overall heat of reaction in the process is therefore approximately −1500 kWh/t 100% $H_2SO_4$. In the generation of high-pressure vapor with the aid of the heat of combustion of the sulfur burning in the first oxidation facility, a heat recovery of around 600 kWh/t 100% $H_2SO_4$ is achieved. Furthermore, an additional around 385 kWh/t 100% $H_2SO_4$ are recovered in the superheating of the high-pressure vapor or in the heating of high-pressure boiler feed water. The difference between the total heat of reaction of the process and the heat recovered gives a residual heat of around 516 kWh/t 100% $H_2SO_4$.

In the case of the use of heat from the intermediate absorption stage for generating medium-pressure vapor in the heat recovery facility, it is possible to recover heat of up to around 140 kWh/t 100% $H_2SO_4$. The recovery of heat in the steam generation facility amounts to around 220 kWh/t 100% $H_2SO_4$, with the share therein of the evaporation of the water being around 145 kWh/t 100% $H_2SO_4$. In the heating of the water/boiler feed water supplied to the steam generation facility, by means of the heated sulfuric acid drawn off from the final absorption stage, a further heat recovery of about 85 kWh/t 100% $H_2SO_4$ is associated. As a result, therefore, the heat recovered overall amounts to about 95% of the heat of reaction of the sulfur burning sulfuric acid process.

With reference now to FIG. 1, a first oxidation facility 1 is supplied with sulfur and air for the oxidation, more particularly for the burning of sulfur to give sulfur dioxide. Here, the air supplied is dried beforehand in the drying facility 5, preferably and in the exemplary embodiment with sulfuric acid, and the air supplied in the drying facility 5 is passed in countercurrent to the sulfuric acid passed in. Preferably and in the exemplary embodiment, the heat of combustion in the burning of the sulfur in the first oxidation facility 1 is used for generating high-pressure vapor. For this purpose, usefully, in the exemplary embodiment, a high-pressure boiler 31 is provided.

Process gas containing sulfur dioxide is introduced from the first oxidation facility 1 into the second oxidation facility 2. Preferably and in the exemplary embodiment, this second oxidation facility 2 is configured as a two-stage converter with a first converter stage 6 and a second converter stage 7. In the exemplary embodiment, each converter stage 6, 7 comprises a plurality of catalyst trays 13. From the first converter stage 6, process gas containing sulfur dioxide and containing sulfur trioxide is introduced via the process gas discharge line 14 into the intermediate absorption facility 3. In this intermediate absorption facility 3, preferably and in the exemplary embodiment, the process gas is passed in countercurrent to sulfuric acid, so that sulfur trioxide present in the process gas is absorbed by the sulfuric acid. The process gas is subsequently drawn off again from the intermediate absorption facility 3 and, in the exemplary embodiment, is introduced via a process gas supply line 15 into the second converter stage 7 of the second oxidation facility 2. First of all, therefore, the process gas flows through the first converter stage 6 of the second oxidation facility 2, then through the intermediate absorption facility 3, and subsequently through the second converter stage 7 of the second oxidation facility 2. Preferably and in the exemplary embodiment, finally, the process gas flows from the second oxidation facility 2 into the final absorption facility 12, in which remaining sulfur trioxide is absorbed from the process gas by sulfuric acid. For this purpose, the process gas originating from the second oxidation facility 2 is passed, in the final absorption facility 12, in countercurrent to sulfuric acid which is passed into the final absorption facility 12.

It is within the scope of the invention for not only the process gas and sulfuric acid but additionally the steam formed in accordance with the invention to be introduced into the intermediate absorption facility 3. This is elucidated in more detail later on below. A substantial evolution of heat is associated with the condensation of the steam in the sulfuric acid, which takes place in the intermediate absorption facility 3, and with the reaction of the steam with sulfur trioxide. As a result, heated sulfuric acid is formed in the intermediate absorption facility 3. This heated sulfuric acid, preferably and in the exemplary embodiment, is drawn out of the liquid phase 16 of the intermediate absorption facility 3 and supplied to the heat recovery facility 8. Preferably and in the exemplary embodiment, the heat recovery facility 8 comprises a medium-pressure boiler 9 for generating medium-pressure vapor. Cooled sulfuric acid is drawn off from this heat recovery facility 8 and can be passed via the introduction line 17 back into the intermediate absorption facility 3. The temperature in the liquid phase 16 of the intermediate absorption facility 3 is, for example, 200 to 220° C. This liquid-phase temperature can be adjusted by way of the amount of sulfuric acid circulated from the intermediate absorption facility 3 via the medium-pressure boiler 9. The medium-pressure vapor generated in the medium-pressure boiler 9 usefully has a pressure of 9 to 12 bar, such as of 10 bar, for example. It is essential in the context of the invention that excess sulfuric acid is drawn off from the intermediate absorption facility 3, and in particular from the heat recovery facility 8, more particularly is drawn from the sulfuric acid circuit of the heat recovery facility 8. Advisedly, and in the exemplary embodiment, excess sulfuric acid cooled in the heat recovery facility 8 is supplied via the discharge line 32 to the steam generation facility 4 for the purpose of generating steam, more particularly for generating low-pressure steam. This low-pressure steam is then introduced from the steam generation facility 4 via the feed line 18 into the intermediate absorption facility 3. In this case, preferably and in the exemplary embodiment, the low-pressure steam is introduced together with the process gas from the first converter stage 6 into the intermediate absorption facility 3.

Advisedly and in the exemplary embodiment, the steam generation facility 4 comprises a cooling facility 10, in which the sulfuric acid is cooled further and in which boiler feed water is heated and partly evaporated to form the steam, more particularly low-pressure steam. This low-pressure steam generally includes further gases originating from the boiler feed water, such as, for example, oxygen and inert gases which were dissolved in the boiler feed water. Consequently, low-pressure steam also implies a low-pressure steam/gas mixture. Attached to the cooling facility 10, preferably and in the exemplary embodiment, is a water vessel 11 (boiler feed water vessel), in which the low-pressure steam is separated from the boiler feed water by flash evaporation. The water vessel 11 here is attached to the intermediate absorption facility 3 with the proviso that low-pressure steam is introduced from this water vessel 11 via the feed line 18 into the intermediate absorption facility 3. Furthermore, preferably and in the exemplary embodiment, remaining heated boiler feed water is drawn from the water vessel 11 and, in fact usefully and in the exemplary embodiment, medium-pressure boiler feed water is taken off via the first water line 19, on the one hand, and high-pressure boiler feed water is taken off via the second water line 20, on the other hand. Advisedly, this boiler feed water taken off is used for heat exchange at other plant components. Advisedly and in the exemplary embodiment, the medium-pressure boiler feed water is supplied via the first water line 19 to the medium-pressure boiler 9, where it is heated, with the aid of the heated sulfuric acid drawn off from the intermediate absorption facility 3, and is evaporated to give medium-pressure vapor. Preferably and in the exemplary embodiment, the high-pressure boiler feed water taken off via the second water line 20 is used for heating the process gas which is supplied to the final absorption facility 12.

Preferably and in the exemplary embodiment, the sulfuric acid used for generating the low-pressure steam in the steam generation facility 4 is drawn off as cooled sulfuric acid via the removal line 21 from the steam generation facility 4. Advisedly and in the exemplary embodiment, this cooled sulfuric acid is supplied to a pump tank 22, there being three pumps 23, 24, and 25 disposed in this pump tank 22 preferably and in the exemplary embodiment. With the first pump 24, the cooled sulfuric acid is passed via the drying line 26 into the drying facility 5 for drying the air supplied to the first oxidation facility 1. Usefully and in the exemplary embodiment, the sulfuric acid used for drying in the drying facility 5 is drawn off at the liquid phase of the drying facility 5 and is preferably discharged from the plant with the second pump 23 of the pump tank 22. With the first pump 24, furthermore, cooled sulfuric acid can be introduced via the feed line 27 into the intermediate absorption facility 3. The third pump 25 serves the sulfuric acid circuit of the final absorption facility 12. In this final absorption facility 12, sulfuric acid is passed in countercurrent to the process gas containing sulfur trioxide that is introduced through the line 33, and heated sulfuric acid results in the liquid phase 29 of the final absorption facility 12. This heated sulfuric acid is drawn off from the liquid phase 29 and then used, preferably and in the exemplary embodiment, in the heat exchanger 30 for heating the water/boiler feed water supplied to the cooling facility 10.

Preferably and in the exemplary embodiment, pump chambers in the pump tank 22, for the pumps 23, 24, and 25, are separated from one another by overflow walls 28. On the overflow of a pump chamber over an overflow wall 28, the cooled sulfuric acid can then be conveyed away by the respectively adjacent pump 23, 24, 25.

What is claimed is:

1. A process for preparing sulfuric acid, the process comprising:
   oxidizing sulfur to sulfur dioxide by way of air in a first oxidation stage;
   oxidizing the sulfur dioxide to sulfur trioxide in a second oxidation stage;
   absorbing the sulfur trioxide in an absorption stage to form sulfuric acid;
   drawing heated sulfuric acid off from the absorption stage and generating steam by using the heated sulfuric acid; and
   introducing the steam at least partly into the absorption stage.

2. The process of claim 1 comprising:
   introducing into the absorption stage process gas from the second oxidation stage that contains the sulfur dioxide and the sulfur trioxide, wherein the absorption stage is configured as an intermediate absorption stage; and after absorption of the sulfur trioxide, recycling the process gas from the intermediate absorption stage to the second oxidation stage, and drawing the heated sulfuric acid off from the intermediate absorption stage.

3. The process of claim 2 comprising:

introducing the process gas into a final absorption stage after the process gas flows through the second oxidation stage; and absorbing the sulfur trioxide originating from the second oxidation stage in the final absorption stage.

4. The process of claim 1 comprising supplying the heated sulfuric acid drawn off from the absorption stage to a heat recovery facility and recovering thermal energy carried by the heated sulfuric acid, wherein the heated sulfuric acid is cooled in the heat recovery facility and is used at least partially for generating the steam.

5. The process of claim 1 comprising:

supplying the heated sulfuric acid drawn off from the absorption stage to a steam generation facility; and heating water with the heated sulfuric acid in the steam generation facility and converting the water at least partially into the steam.

6. The process of claim 5 comprising supplying cooled sulfuric acid drawn off from the steam generation facility to a final absorption stage, where the sulfur trioxide is passed countercurrent to the sulfuric acid and absorbed by the sulfuric acid.

7. The process of claim 5 comprising drying the air required for the oxidation in the first oxidation stage with the sulfuric acid that has been cooled in the steam generation facility and drawn off from the steam generation facility.

8. The process of claim 5 comprising introducing the sulfuric acid that has been cooled in the steam generation facility and drawn off from the steam generation facility into the absorption stage for the absorption of the sulfur trioxide; and passing the sulfur trioxide countercurrent to the sulfuric acid in the absorption stage.

9. An apparatus for preparing sulfuric acid, the apparatus comprising:

a first oxidation facility for generating sulfur dioxide;

a second oxidation facility for oxidizing the sulfur dioxide to sulfur trioxide;

an absorption facility attached to the second oxidation facility, the absorption facility for absorbing the sulfur trioxide by way of sulfuric acid;

a steam generation facility joined to the absorption facility, wherein sulfuric acid that is drawn off from the absorption facility is configured to be supplied to the steam generation facility for generating steam; and a feed line for introducing the steam from the steam generation facility into the absorption facility.

10. The apparatus of claim 9 comprising a drying facility for drying air that is configured to be introduced into the first oxidation facility for oxidizing sulfur to the sulfur dioxide, wherein the drying facility is connected to the absorption facility, wherein excess sulfuric acid from the absorption facility can be introduced into the drying facility for drying the air.

11. The apparatus of claim 9 wherein the second oxidation facility is configured as a multistage converter, wherein a first converter stage is connected via a process gas discharge line to the absorption facility, wherein the absorption facility is joined via a process gas supply line to a second converter stage so that process gas from the first converter stage can be passed through the absorption facility and into the second converter stage.

12. The apparatus of claim 9 wherein the absorption facility is joined to a heat recovery facility having a boiler, wherein heated sulfuric acid can be introduced from the absorption stage into the boiler for generating vapor, wherein cooled sulfuric acid can be discharged from the boiler and at least one of recycled to the absorption stage or supplied to the steam generation facility.

13. The apparatus of claim 9 wherein the steam generation facility comprises a cooling facility in which water is heated and at least partially evaporated, wherein a water vessel is joined to the cooling facility, wherein in the water vessel the steam is separated from the water by flash evaporation, where the water vessel is joined to the absorption facility so that the steam can pass from the water vessel into the absorption facility.

14. The apparatus of claim 9 wherein the steam generation facility is configured as an intermediate absorption stage.

15. The apparatus of claim 14 wherein the steam generation facility is connected to at least one of a final absorption facility or a drying facility for drying the air supplied to the first oxidation facility, so that cooled sulfuric acid drawn off from the steam generation facility can be at least one of introduced into the drying facility for drying the air or passed into the final absorption facility for absorbing the sulfur trioxide.

16. The apparatus of claim 9 wherein the steam generation facility is joined to the absorption facility such that cooled sulfuric acid drawn off from the steam generation facility can be introduced into the absorption facility for absorbing the sulfur trioxide.

17. The apparatus of claim 9 wherein the steam drawn off from the steam generation facility can be introduced together with process gas drawn off from the second oxidation facility into the absorption facility.

* * * * *